US008320616B2

(12) United States Patent
Kaiser et al.

(10) Patent No.: US 8,320,616 B2
(45) Date of Patent: Nov. 27, 2012

(54) IMAGE-BASED SYSTEM AND METHODS FOR VEHICLE GUIDANCE AND NAVIGATION

(75) Inventors: Michael Kent Kaiser, Crestveiw, FL (US); Nicholas Raphael Gans, Gainesville, FL (US); Warren Everett Dixon, Gainesville, FL (US); Siddhartha Satish Mehta, Pune (IN)

(73) Assignee: University of Florida Research Foundation, Inc., Gainesville, FL (US)

( * ) Notice: Subject to any disclaimer, the term of this patent is extended or adjusted under 35 U.S.C. 154(b) by 785 days.

(21) Appl. No.: 12/376,709

(22) PCT Filed: Aug. 21, 2007

(86) PCT No.: PCT/US2007/076419
§ 371 (c)(1),
(2), (4) Date: Jul. 9, 2009

(87) PCT Pub. No.: WO2008/024772
PCT Pub. Date: Feb. 28, 2008

(65) Prior Publication Data
US 2009/0285450 A1 Nov. 19, 2009

Related U.S. Application Data

(60) Provisional application No. 60/838,951, filed on Aug. 21, 2006.

(51) Int. Cl.
*G06K 9/00* (2006.01)
(52) U.S. Cl. ........ 382/103; 382/190; 382/195; 382/204; 382/205; 348/113; 348/169; 340/988; 701/489; 701/512

(58) Field of Classification Search .................... None
See application file for complete search history.

(56) References Cited

U.S. PATENT DOCUMENTS
6,766,036 B1 * 7/2004 Pryor ........................... 382/103
(Continued)

FOREIGN PATENT DOCUMENTS
GB 2041689 9/1980
(Continued)

OTHER PUBLICATIONS
Chaumette et al., "2D 1/2 Visual Servoing with Respect to a Planar Object," Sep. 30, 1997, Workshop on New Trends in Image-Based Robot Servoing, pp. 45-52.*
(Continued)

*Primary Examiner* — John Lee
(74) *Attorney, Agent, or Firm* — Thomas Horstemeyer, LLP

(57) ABSTRACT

A method of estimating position and orientation of a vehicle using image data is provided. The method includes capturing an image of a region external to the vehicle using a camera mounted to the vehicle, and identifying in the image a set of feature points of the region. The method further includes subsequently capturing another image of the region from a different orientation of the camera, and identifying in the image the same set of feature points. A pose estimation of the vehicle is generated based upon the identified set of feature points and corresponding to the region. Each of the steps are repeated at with respect to a different region at least once so as to generate at least one succeeding pose estimation of the vehicle. The pose estimations are then propagated over a time interval by chaining the pose estimation and each succeeding pose estimation one with another according to a sequence in which each was generated.

17 Claims, 12 Drawing Sheets

U.S. PATENT DOCUMENTS 7,376,507 B1 * 5/2008 Daily et al. .................. 701/504

FOREIGN PATENT DOCUMENTS

| GB | 2041689 A | * | 9/1980 |
| WO | 20060023222 A | | 1/2006 |
| WO | WO 2006/002322 | | 1/2006 |

OTHER PUBLICATIONS

International Search Report and Written Opinion dated Jan. 24, 2008.

Chaumette, et al., "2D 1/2 Visual Servoing with Respect to a Planar Object," Workshop on New Trends in Image-Based Robot Servoing, Sep. 30, 1997 pp. 45-52.

Helmick, et al., "Path Following Using Visual Odometry for a Mars Rover in High-Slip Environments," Proc. IEEE Aerospace Conference, Mar. 13, 2004, pp. 772-789.

Chen, et al., "Navigation Function Based Visual Servo Control," Clemson University CRB Technical Report, Sep. 9, 2004.

Helmick, et al., "Path Following Using Visual Odometry for a Mars Rover in High-Slip Environments", PROC. 2004 IEEE Aerospace Conference, Mar. 13, 2004, pp. 772-789.

Chen, et al., "Navigation Function Based Visual Servo Control", Clemson University CRB Techical Report, Sep. 9, 2004.

Chaumette, et al., "2D 1/2 Visual Servoing With Respect to a Planar Object", Workshop on New Trends in Image-Based Robot Servoing, Sep. 30, 1997, pp. 45-52.

M. K. Kaiser, N. Gans and W. Dixon, "Vision-Based Estimation and Control of an Aerial Vehicle through Chained Nomography," IEEE Transactions on Aerospace and Electronic Systems, vol. 46, No. 3, pp. 1064-1077, 2010.

M. K. Kaiser, N.R. Gans, W.E. Dixon, "Localization and Control of an Aerial Vehicle through Chained, Vision-Based Pose Reconstruction," Proc. American Controls Conference, 2007, pp. 3874-3879.

M. Kaiser, N.R. Gans and W.E. Dixon "Position and Orientation of an Aerial Vehicle through Chained, Vision-Based Pose Reconstruction," Proc. AIAA conference on Guidance, Navigation and Control, 2006.

* cited by examiner

IMAGE-BASED SYSTEM AND METHODS FOR VEHICLE GUIDANCE AND NAVIGATION

CROSS-REFERENCE TO RELATED APPLICATIONS

This application is the national stage entry of International Application No. PCT/US2007/076419, filed Aug. 21, 2007, which claims priority to U.S. Provisional Patent Application No. 60/838,951, filed Aug. 21, 2006, the disclosure of which is hereby incorporated by reference.

STATEMENT REGARDING FEDERALLY SPONSORED RESEARCH OR DEVELOPMENT

This invention was made with United States government support under AFOSR contract number F49620-03-1-0381, AFRL contract number FA4819-05-D-0011, and by research grant No. US-3715-05 from BARD, the United States—Israel Binational Agricultural Research and Development Fund at the University of Florida. The United States government has certain rights to this invention.

FIELD OF THE INVENTION

The present invention is related to the fields of vehicle guidance and navigation, and more particularly, to systems and techniques for guiding and providing navigation to a vehicle such as an aerial vehicle using image data.

BACKGROUND OF THE INVENTION

Data provided by a Global Positioning System (GPS) is typically the principal navigational sensor modality used for vehicle guidance, navigation, and control. GPS, however, has several vulnerabilities owing to unintentional and deliberate interference with GPS signals. Unintentional interference includes ionosphere interference, also known as ionospheric scintillation, and radio frequency interference stemming from television broadcasts, VHF signals, cell phones, and two-way pagers, for example.

Strategies to mitigate the vulnerabilities of GPS have tended to rely primarily on archaic and/or legacy methods. Unfortunately, such navigational modalities are limited by the range of land-based transmitters, which also tend to be expensive and ill suited for remote or hazardous environments. Accordingly, there is a need for other methods of estimating position and orientation of a vehicle when GPS data is unavailable.

Inertial Measurement Units (IMUs) are also widely used for vehicle navigation and guidance. Indeed, IMUs are frequently used as a backup to GPS. A weakness of IMUs, however, is that they can drift over time, and as a result errors may be continuously added to position estimates.

Advancements in computer vision and control theory have prompted interest in image-based techniques and systems as an alternative or adjunct to GPS. One issue that has inhibited the use of image-based systems and techniques, however, is the difficulty in reconstructing inertial measurements from a projected image. Accordingly, there remains a need for a more effective and efficient mechanism for providing image-based estimations of vehicle position and orientation.

BRIEF SUMMARY OF THE INVENTION

The present invention is directed to systems and methods for providing image-based estimations using a geometric approach and homography relationships. One aspect of the invention is a procedure for using a sequence images to chain, in a daisy-chain fashion, multiple inertial coordinate estimates so that inertial coordinates of a vehicle can be determined between each successive image. One benefit of this aspect of the invention is that earlier-acquired data, such as GPS data, can be linked with image data to provide inertial measurements after and while GPS is unavailable. Accordingly, the invention can provide estimations of position and orientation of a vehicle using images corresponding to piecewise landscapes.

One embodiment of the invention is a method of estimating position and orientation of a vehicle using image data. The method can include capturing an image of a region external to the vehicle using a camera mounted to the vehicle, and identifying in the image a set of feature points of the region; subsequently capturing another image of the region from a different orientation of the camera, and identifying in the image the same set of feature points; and generating a pose estimation of the vehicle based upon the identified set of feature points and corresponding to the region. The method can further include repeating each of the previous steps at least once so as generate at least one succeeding pose estimation of the vehicle. The pose estimations can be propagated over a time interval by chaining the pose estimation and each succeeding pose estimation one with another according to a sequence in which each was generated.

Another embodiment of the invention is a system for estimating position and orientation of a vehicle using image data. The system can include a camera mounted to the vehicle. Additionally the system can include a pose estimator, implemented in circuitry and/or computer-readable instruction code. The pose estimator, more particularly, can be configured to (a) cause the camera to capture an image of a region external to the vehicle using a camera mounted to the vehicle, and identify in the image a set of feature points of the region; (b) subsequently cause the camera to capture another image of the region from a different orientation relative to the region, and identify in the image the set of feature points; (c) generate a pose estimation of the vehicle based upon the identified set of feature points and corresponding to the region; (d) generate at least one succeeding pose estimation of the vehicle by repeating steps (a)-(c) with respect to a different region; and (e) propagate the pose estimations over a time interval by chaining the pose estimation and each succeeding pose estimation one with another according to a sequence in which each was generated.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

The invention is directed to systems and methods that can be used for the navigation and guidance of vehicles, such as airplanes and other aerial vehicles. One aspect of the invention is the extension of vehicle position and orientation, or pose, estimation techniques. According to this aspect of the invention, a sequence of images are generated using an image capture device, such as a camera or radar, for example and feature points contained within the images are identified. The image-capture device thus can act as a navigation sensor by detecting and tracking feature points, which can identified in the sequence of images. Based upon the feature points, the rotation and translation of the image-capture device—and, accordingly, by appropriate translation, the vehicle as well—are determined according to the techniques and procedures described herein. Estimates of the pose of the vehicle as it moves over time are thereby determined.

In particular, according to this aspect of the invention, images are used to generate estimates of the change in a vehicle's pose, and by a procedure for linking the estimates one to another in sequence, described herein as daisy-chaining, the pose estimations can be propagated through time and correlated so as to estimate the position and orientation of the vehicle. Accordingly, vehicle guidance and navigation information can be obtained even when the position and orientation of the vehicle can not, for whatever reason, be determined with a conventional inertial measurement system, such as a global positioning system (GPS).

Figure 1:
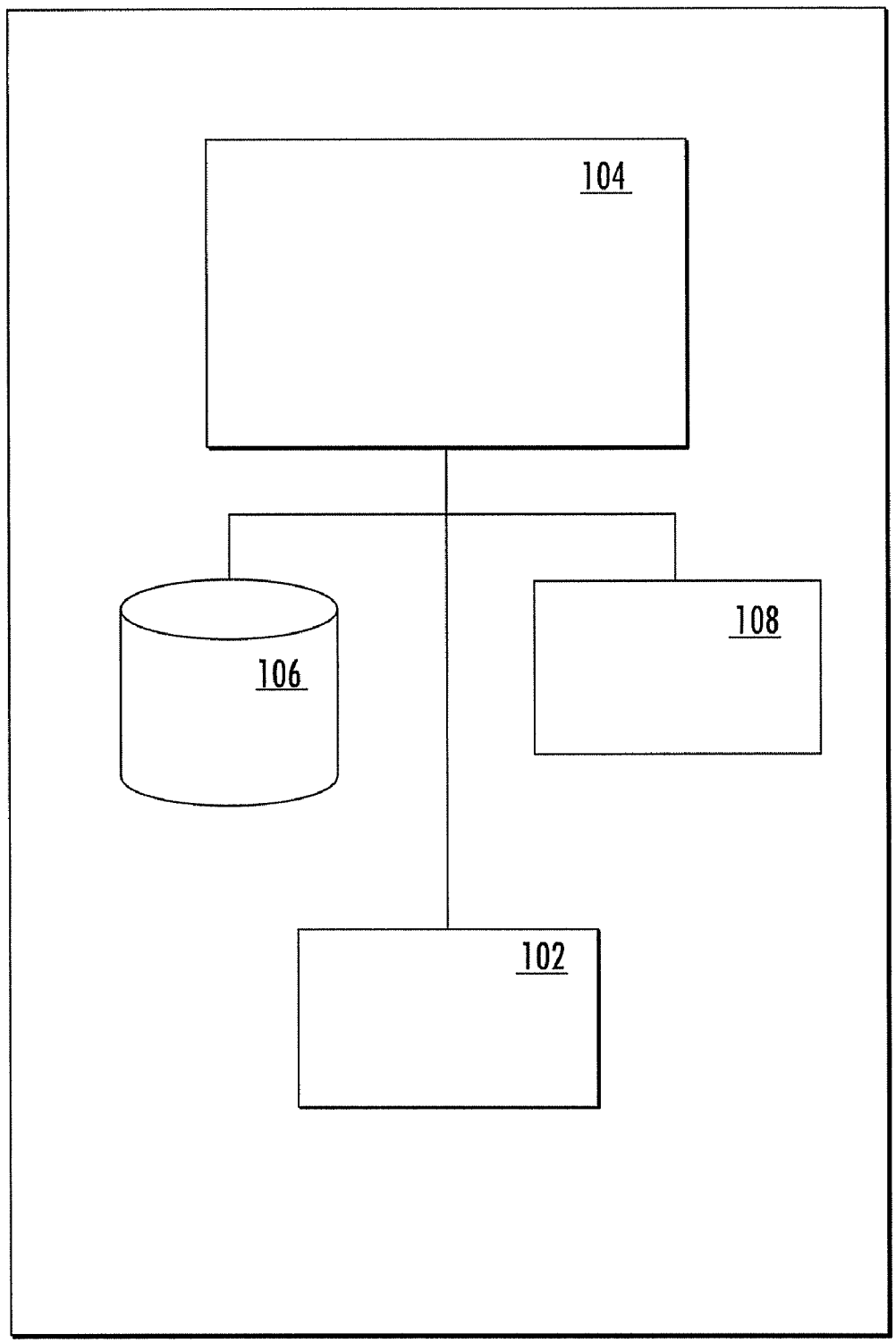
FIG. 1 is a schematic view of a system for estimating position and orientation of a vehicle using image data, according to one embodiment of the invention.

Referring initially to FIG. 1, an exemplary system 100 according to one embodiment of the invention is schematically illustrated. The system 100 can be deployed in a vehicle, such as an aerial vehicle. The system 100 illustratively includes an image-capture device, such as a camera 102, that is carried by the vehicle for capturing images external to the vehicle. The system 100 illustratively includes a pose estimator 104 for generating a sequence of pose estimates of the vehicle at successive times. As used herein, and as will be readily understood by one of ordinary skill in the art, the term pose refers to the position and orientation of the vehicle at any given moment in time.

The pose estimator 104, according to one embodiment, can be implemented as computer-readable instructions for causing a computing device comprising logic-based circuitry, such as a general-purpose or application-specific computer, for performing the pose estimating functions described herein. Accordingly, the system 100 optionally can include an electronic memory for storing data and instructions executed by pose estimator module 104. In an alternative embodiment, however, the pose estimator can be implemented in dedicated hard-wired circuitry that is configured to perform the pose estimating functions. Moreover, in still another embodiment, the pose estimator 104 is implemented in a combination of computer-readable instruction code and dedicated hard-wired circuitry.

The system 100 optionally can include an inertial system 108, such as the aforementioned GPS. The inertial system 108 can generate an initial estimate or measurement of the position and orientation of the vehicle at a particular instant. The initial estimate or measurement can subsequently be combined with pose estimates determined by the pose estimator 104 based upon image data generated with the camera 102. The subsequent estimates so generated, as already noted, can enable the pose of the vehicle to be determined even when the pose can not be determined based upon data generated by the inertial system 108.

The operative features of the system 100, described more particularly below, are based on certain underlying theoretical concepts and mathematical constructs, which are initially considered. One aspect of the invention is pose reconstruction based on two distinct views captured as images. Consider first certain underlying Euclidean relationships. A body-fixed coordinate frame $F_c$ can be constructed in order to define the position and orientation of the camera with respect to a constant world frame $F_w$. The world frame $F_w$ can represent, for example, a departure point, destination point, or any other point of interest. Rotation and translation of the coordinate frame $F_c$ with respect to the world frame $F_w$ is defined, respectively, as $R(t) \in \Box^{3 \times 3}$ and $x(t) \in \Box^3$. At two successive times, $t_0$ and $t_1$, the rotation and translation of the camera frame from $F_c(t_0)$ to $F_c(t_1)$ are denoted $R_{01}(t_1)$ and $x_{01}(t_1)$, respectively.

As the camera moves with the vehicle, a collection of images can be captured by the camera, each image having a set or collection, I, of four or more coplanar and non-colinear static feature points, the term feature point simply denoting a particular point of interest. For ease of explanation, but without loss of generality, it is assumed that I=4. Known techniques of image processing can be used to identify and select coplanar and non-colinear feature points within an image. Nonetheless, if four feature points are not available, linear solutions for eight or more non-coplanar points can be found according to various techniques described, for example, in B. Boufama and R. Mohr, "Epipole and Fundamental Matrix Estimation Using Virtual Parallax," *Proc. Int. Conf on Computer Vision*, 1995, pp. 1030-1035, which is incorporated in its entirety herein. Other references include H. Longuet-Higgins, "A Computer Algorithm for Reconstructing a Scene from Two Projections," *Nature*, September 1981, pp. 133-135, and R. Hartley, COMPUTER VISION—ECCV'02, LECTURE NOTES IN COMPUTER SCIENCES, Springer-Verlag, 1992, each of which is also incorporated herein in its entirety. Alternatively, techniques for determining nonlinear solutions for five or more non-coplanar feature points can be utilized, as described, for example, in D. Nister, "An Efficient Solution to the Five-Point Relative Pose Problem," *IEEE Transactions on Pattern Analysis and Machine Intelligence*, June 2004, pp. 756-770, also incorporated herein in its entirety.

Figure 2:
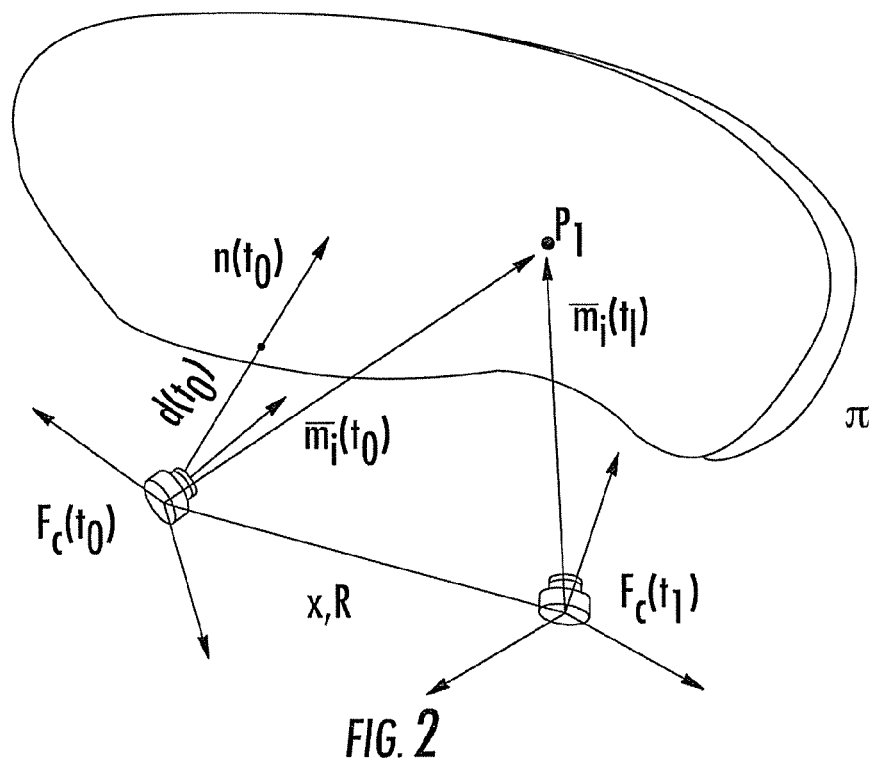
FIG. 2 is a schematic representation of Euclidean relationships between two regions, which can be utilized by the system of FIG. 1 in estimating position and orientation of a vehicle.

A feature point $p_i(t)$ has coordinates $\overline{m}_i(t) = [x_i(t), y_i(t), z_i(t)]^T \in \Box^3$, for all $i \in \{1, \ldots, I\}$ in $F_c$. FIG. 2 schematically illustrates the coordinate frames $F_c$ of a camera, at time $t_0$, $F_c(t_0)$, and at time $t_1$, $F_c(t_1)$, where the camera has undergone rotation R and translation x between time $t_0$ and time $t_1$. Standard geometric relationships can be applied to the illustrated coordinate systems to obtain the following relationships:

$$\bar{m}_i(t_1) = R_{01}\bar{m}_i(t_0) + x, \quad (1)$$

$$\bar{m}_i(t_1) = H\bar{m}_i(t_0), \quad (2)$$

$$\bar{m}_i(t_1) = \left(R_{01}(t_1) + \frac{x_{01}(t_1)}{d(t_0)}n(t_0)^T\right)\bar{m}_i(t_0). \quad (3)$$

where H(t) is the Euclidean homography matrix, and $n(t_0)$ is the constant unit vector from $F_c$ normal to the plane π. The distance from $F_c$ to the plane π along $n(t_0)$ is $d(t_0)$. Normalizing the Euclidean coordinates yields:

$$m_i(t) = \frac{\bar{m}_i(t)}{z_i(t)}. \quad (4)$$

Accordingly, equation (3) can be rewritten as $$m_i(t_1) = \frac{z_i(t_0)}{z_i(t_1)}\left(R_{01}(t_1) + \frac{x_{01}(t_1)}{d(t_0)}n(t_0)^T\right)m_i(t_0) \quad (5)$$
$$= \alpha_i H m_i(t_0).$$

where $\alpha_i \in \square$ for all $i \in \{1, \ldots, I\}$ is a scaling factor.

Projective relationships can be established using standard projective geometry. Using the standard projective geometry, the Euclidean coordinate $m_i(t)$ can be expressed as image-space coordinates $p_i(t) = [u_i(t), v_i(t), 1]^T$. The projected pixel coordinates are related to the normalized Euclidean coordinates $m_i(t)$ according to the know pin-hole model as $$p_i = A m_i, \quad (6)$$

where A is an invertible, upper triangular camera calibration matrix, as described in Y. Ma, S. Soatto, J. Kosecka, and S. Sastry, AN INTRODUCTION TO 3-D VISION, Springer, 2004, incorporated herein in its entirety. Specifically, the matrix is defined as $$A \triangleq \begin{bmatrix} a & -a\cos\phi & u_0 \\ 0 & \frac{b}{\sin\phi} & v_0 \\ 0 & 0 & 1 \end{bmatrix} \quad (7)$$

where $u_0$ and $v_0$, $u_0, v_0 \in \square$, denote the pixel coordinates of the principal point (the image center as defined by the intersection of the optical axis with the image plane), a and b, $a,b \in \square$, are scaling factors of the pixel dimensions, and $\phi \in \square$ is the skew angle between camera axes.

Using equation (6), the Euclidean relationship expressed by equation (5) can be expressed as $$p_i(t_1) = \alpha_i A H A^{-1} p_i(t_0) \quad (8)$$
$$= \alpha_i G p_i(t_0)$$

Sets of linear equations can be derived from equation (8) for determining the projective and Euclidean homography matrices G(t) and H(t) up to a scalar multiple. Given images of four or more feature points taken at $F_c(t_0)$ and $F_c(t_1)$, various techniques can be used to decompose the Euclidean homography to obtain $\alpha_i$, $n(t_0)$, $$\frac{x_{01}(t_1)}{d(t_0)},$$

and $R_{01}(t_1)$. The distance $d(t_0)$ must be separately determined. The distance can be measured in the context of an aerial vehicle, for example, through an altimeter. In the context of an aerial vehicle, or other type of vehicle, the distance $d(t_0)$ can be measured, for example, using a radar range finder. Alternatively, in the context of various types of vehicles, the distance $d(t_0)$ can be estimated using a priori knowledge of the relative feature point locations, using stereoscopic cameras, or based on an estimator signal in a feedback control system.

As already noted, one aspect of the invention is providing navigation and guidance to a vehicle based upon a technique of daisy-chaining, or simply chaining, multiple pose estimations based upon sequential groups of feature points. This aspect is described herein in the context of an aerial vehicle. It will be readily apparent to one of ordinary skill in the art, however, that the same techniques can be used in the context of other types of vehicles as well.

Figure 3:
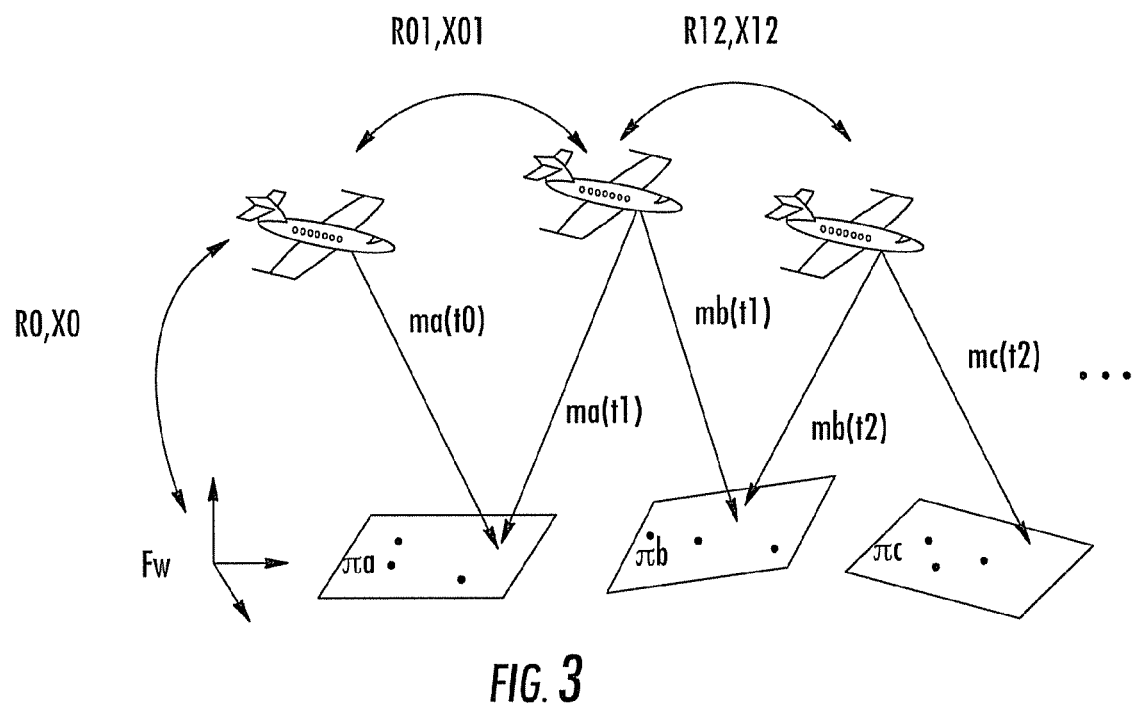
FIG. 3 is a schematically illustrates a vehicle pose estimation chaining procedure that can be performed with the system of FIG. 1.

FIG. 3 schematically illustrates the technique of pose estimation chaining, according to one aspect of the invention. The aerial vehicle is shown in a succession of poses at different points in time $t_0$, $t_1$, and $t_2$, with respect to different planar regions $\pi_a$, $\pi_b$, and $\pi_c$ at different times. Successive rotations $R_0$, $R_{01}$, and $R_{12}$, and successive translations $x_0$, $x_{01}$, and $x_{12}$, as well as respective coordinates $m_a(t_0)$, $m_a(t_1)$, $m_b(t_1)$, $m_b(t_2)$, and $m_c(t_2)$. The aerial vehicle, according to one embodiment, is equipped with a GPS (not explicitly shown) and a camera (also not explicitly shown) that is capable of capturing images of a landscape external to the vehicle. Although equipped with a GPS, as the ensuing description reveals, the chaining technique of the invention enables the estimation of vehicle position and orientation when the vehicle is operated within a GPS-denied environment; that is, the pose of the vehicle can be estimated without GPS data.

The vehicle-mounted camera has only a limited field of view, and accordingly, the vehicle's motion can cause observed feature points in one or more images to be obliterated in other images captured at different positions or different orientations. The chaining technique of the invention allows pose estimation to continue even if the camera's limited field of view would otherwise be inadequate for facilitating the estimation.

In FIG. 3, the aerial vehicle begins operating in a GPS-denied environment at time $t_0$, when the rotation $R_0(t_0)$ and translation $x_0(t_0)$ between $F_c(t_0)$ and $F_w(t_0)$ are known. The rotation between $F_c(t_0)$ and $F_w(t_0)$ can be determined through GPS data and/or using other data generated, for example, by a gyroscope and/or a compass. Without loss of generality, the GPS unit is assumed to be fixedly positioned at location on the vehicle corresponding to the origin of the vehicle's coordinate frame. It is further assumed that the position and orientation of the camera coordinate frame is known with respect to the position and orientation of the vehicle's coordinate frame. Thus, the change in position and orientation of the camera can be related to the position and orientation of the vehicle through a coordinate transformation as described above.

Figure 4:
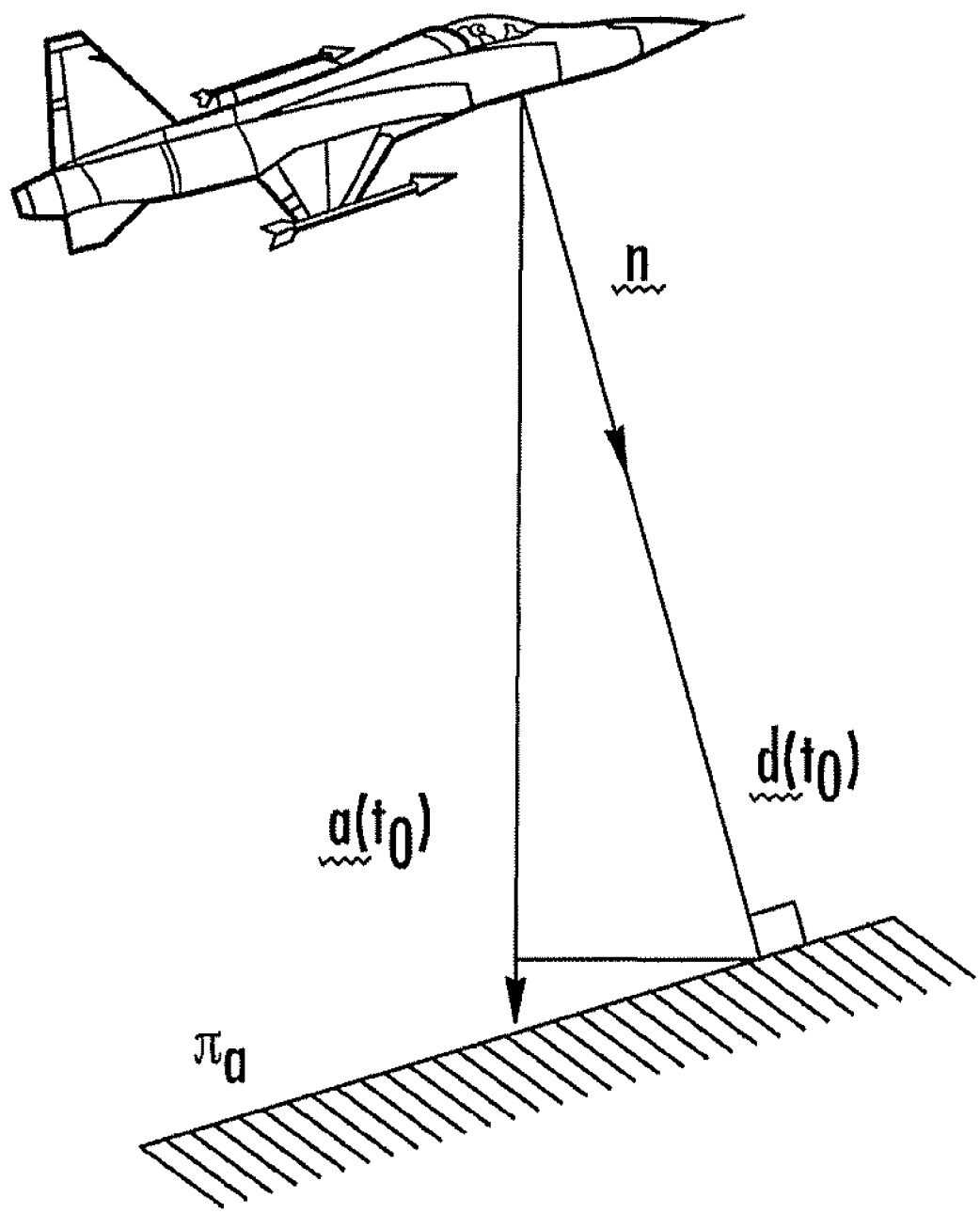
FIG. 4 is a schematically illustrates a depth estimation procedure that can be performed with the system of FIG. 1.

Referring additionally to FIG. 4, a schematic view illustrating a technique for depth estimation from altitude, according to another aspect of the invention, is provided. The aerial vehicle is shown with respect to the planar region $\pi_a$ at an altitude of $a(t_0)$ and at distance along the normal vector $\underline{n}$ of $d(t_0)$. If it is further assumed that the GPS is capable of determining altitude, for example, in conjunction with an altimeter, then the aerial vehicle's altitude $a(t_0)$ is also known.

Referring specifically to FIG. 3, as illustrated, the initial set of tracked coplanar and non-colinear feature points are contained in the planar region $\pi_a$. These feature points have the normalized Euclidean coordinates $m_a(t_0)$ and $m_a(t_1)$, as illustrated. The planar region $\pi_a$ is perpendicular to the unit vector $n_a(t_0)$ in the camera frame and is at a distance $d_a(t_0)$ from the origin of the camera's coordinate frame. At time $t_1$, the vehicle has rotation $R_{01}(t_1)$ and translation $x_{01}(t_1)$, which can be determined from the images by decomposing the relationships given by equation (8).

As already described, $R_{01}(t_1)$ and $$\frac{x_{01}(t_1)}{d_a(t_0)}$$

can be determined from two corresponding images of the feature points $p_a(t_0)$ and $p_a(t_1)$. A measurement or estimate for $d_a(t_0)$, however, is required in order to determine $x_{01}(t_1)$. Distance sensors mounted to the vehicle can be used to measure or estimate $d_a(t_0)$ or, alternatively, an estimate can be obtained based upon a priori knowledge of the relative positions of the feature points in $\pi_a$. With an additional assumption, however, it is possible to estimate $d_a(t_0)$ geometrically using altitude information acquired from a last GSP reading and/or using an altimeter. Referring specifically to FIG. 4, if $a(t_a)$ is a vector in the direction of gravity with magnitude equal to the altitude above $\pi_a$ (e.g., the ground has constant slope between the feature points and projection of the vehicle's position to the ground), then the distance $d_a(t_0)$ can be determined as $$d_a(t_0) = \underline{n}(t_0) a a(t_0) \quad (9)$$

Once $R_{01}(t_1)$, $d_a(t_0)$, and $x_{01}(t_1)$ are determined, the rotation $R_1(t_1)$ and translation $x_1(t_1)$ can be determined with respect to $F_w$ as $$R_1 = R_0 R_{01} \text{ and}$$

$$x_1 = R_0 x_{01} + x_0.$$

Referring again to FIG. 3, as shown, a new collection of feature points $p_b(t_1)$ can be obtained with respect to the collection of points on planar region $\pi_b$. At time $t_2$, the set of points $p_b(t_1)$ and $p_b(t_2)$ can be used to determine $R_{12}(t_2)$ and $$\frac{x_{12}(t_2)}{d_b(t_1)},$$

which provides the rotation and scaled translation of $F_c$ with respect to $F_w$. If $\pi_a$ and $\pi_b$ are the same plane, then $d_b(t_1)$ can be determined as $$d_b(t_1) = d_a(t_1) = d_a(t_0) + x_{01}(t_1) \cdot n(t_0) \quad (10)$$

If $\pi_a$ and $\pi_b$ are the same plane, $x_{12}(t_2)$ can be correctly scaled. Additionally $R_2(t_2)$ and $x_2(t_2)$ can be computed in a manner similar to that described with respect to $R_1(t_1)$ and $x_1(t_1)$. Estimations are propagated at each time instance by chaining the different estimates. Accordingly, estimations can be propagated by the chaining technique without further reliance on the GPS.

In the general case, according to which $\pi_a$ and $\pi_b$ are not coplanar, $d_b(t_1)$ can not be determined according to equation (10). If, however, $p_b$ and $p_a$ are both visible for two or more image frames, it is still possible to calculate $d_b(t)$ geometrically. Assume that at a time $t_{1-}$, occurring shortly before the above-described chaining operation is performed, $P_b$ and $p_a$ are both visible in the image. At $t_{1-}$, an additional set of homography equations can be solved for the points $p_b$ and $p_a$ at times $t_{1-}$ and $t$:

$$m_{ai}(t_1) = \frac{z_{ai}(t_0)}{z_{ai}(t)}\left(R + \frac{x}{d_a(t_{1-})}n_a(t_{1-})^T\right)m_{ai}(t_{1-}) \quad (11)$$
$$= \alpha_a H_a m_{ai}(t_{1-}),$$

and $$m_{bi}(t_1) = \frac{z_i(t_0)}{z_i(t)}\left(R + \frac{x}{d_b(t_{1-})}n(t_0)^T\right)m_{bi}(t_{1-}) \quad (12)$$
$$= \alpha_b H_b m_{bi}(t_{1-}),$$

where each of the variables is defined as above.

Noted that in equations (11) and (12), R and x are the same, but the distance and normal to the plane are different for the two sets of points. The distance $d_a(t_{1-})$ can found in a manner similar to that described with respect to $d_b(t_1)$ using equation (10). Defining $$x_b = \frac{x}{d_b(t_{1-})} \text{ and } x_a = \frac{x}{d_a(t_{1-})},$$

the translation x is solved as $$x = \tilde{d}_a(t_{1-}) x_a$$

and $d_b(t_{1-})$ is $$d_b(t_{1-}) = \frac{x_b^T x}{\|x_b\|}.$$

Then $d_b(t_1)$ can be determined from equation (10). Additional sensors, such as an altimeter, can provide an additional estimate of the change in altitude. The additional estimate can be used in conjunction with equation (10) to update depth estimates.

The described functions and procedures are, according to one embodiment, performed by the pose estimator 104 of the system 100 illustrated in FIG. 1. More particularly, the pose estimator can be configured, in computer-readable code and/or hard-wired circuitry, to cause the camera 102 to capture an image of a region external to the vehicle using a camera mounted to the vehicle. The pose estimator 104 then identifies in the image a set of feature points of the region. The pose estimator 104 subsequently causes the camera to capture another image of the region from a different orientation relative to the region, and again identifies in the subsequently-captured image the set of feature points. Based upon the identified set of feature points, the pose estimator 104 generates a pose estimation of the vehicle corresponding to the region.

The pose estimator 104 performs these functions again in order to generate a succeeding pose estimation of the vehicle. The procedure can be repeated to generate additional pose estimations with respect to different regions. The pose estimator 104 can then propagate the pose estimations over a time interval by performing a chaining procedure. The chaining procedure can chain the initial pose estimation and each succeeding pose estimation one with another in a "daisy-chain" manner according to the sequence in which each was generated.

The pose estimator 104 can be configured to generate each of the pose estimations by determining a Euclidean homography matrix based upon the identified feature points, as already described. By decomposing the Euclidean homography matrix, as also described above, the pose estimator 104 can then determine a scaling factor, a unit normal vector perpendicular to the region, a rotation, and a ratio of a translation to a distance from said camera to the region, wherein the distance is measured by a vector parallel to the unit normal vector.

The pose estimator 104 can be further configured to determine the distance from the camera 102 to the region and, based upon the determined distance, compute the translation from the ratio of the translation to the distance from the camera to the region. More particularly, the pose estimator 104 pose estimator can be configured to determine the distance by projecting another vector measuring the distance from the camera to the region onto the unit normal vector. Additionally, the pose estimator 104 can be further configured to determine, with respect to a constant world frame, a corresponding rotation and a corresponding translation, as also described above. The rotation and translation can be determined based upon a previously determined rotation and translation with respect to the constant world frame, both of which according to a particular embodiment, can be determined based upon data obtained with the optional inertial measurement system 108.

The pose estimator 104 can be further configured to determine another distance parallel to another unit normal vector perpendicular to another region if the two regions are coplanar according to the procedure described above. Additionally, or alternatively, the pose estimator can be configured to determine another distance parallel to another unit normal vector perpendicular to another region if the two regions are not coplanar, according to the alternative procedure described above.

Figure 5:
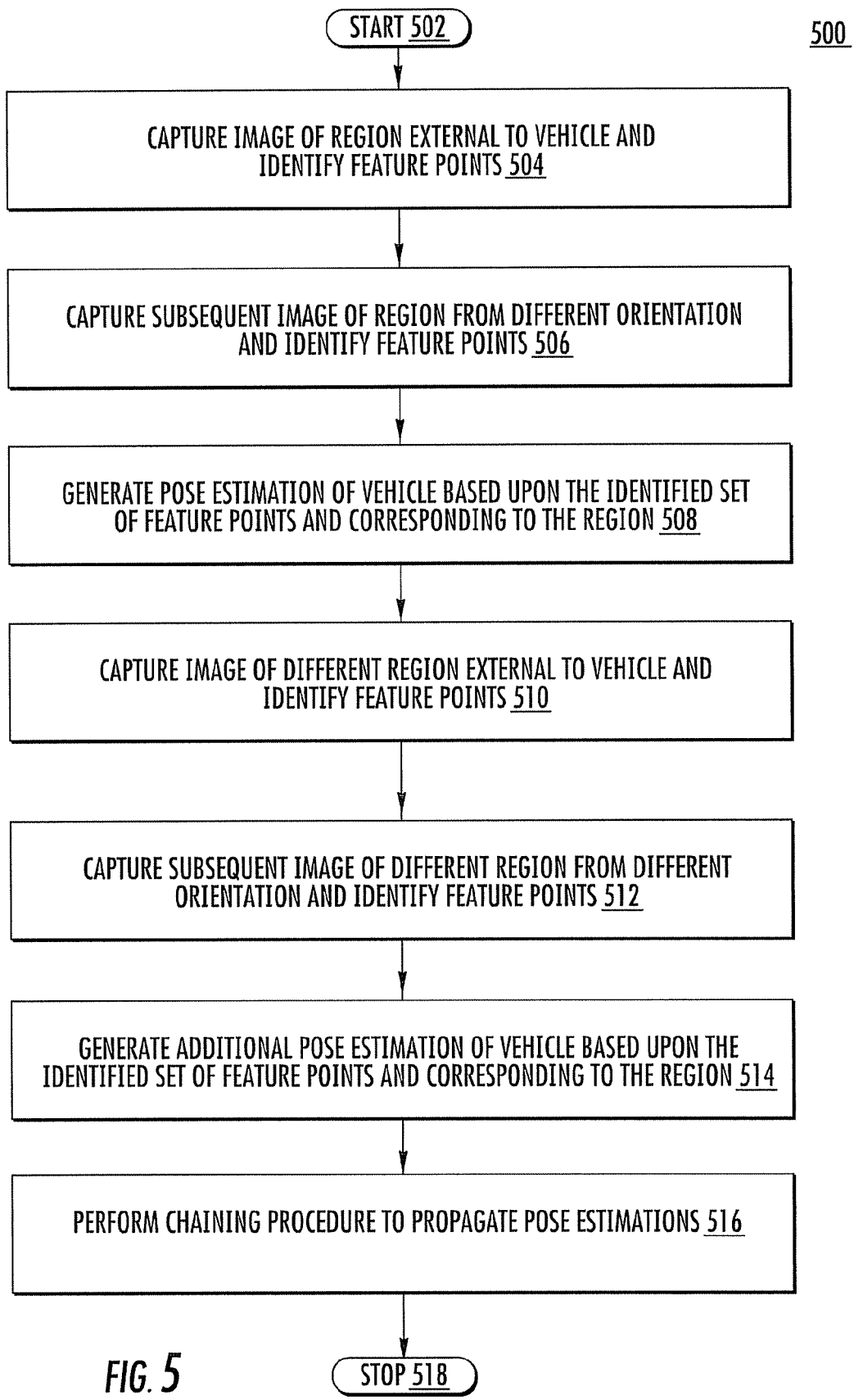
FIG. 5 is a flowchart of exemplary steps in a method 500 of estimating position and orientation of a vehicle using image data, according another embodiment.

Referring now to FIG. 5, a flowchart of exemplary steps in a method 500 of estimating position and orientation of a vehicle using image data, according another embodiment, is provided. After the start at step 502, the method at step 504 illustratively includes capturing an image of a region external to the vehicle using a camera mounted to the vehicle, and identifying in the image a set of feature points of the planar region. At step 506, the method 500 illustratively includes subsequently capturing another image of the region from a different orientation of the camera, and identifying in the image the same set of feature points. The method further includes generating a pose estimation of the vehicle based upon the identified set of feature points and corresponding to the region, at step 508. The procedure is repeated at least once, as illustrated in steps 510-514, for a different region. As a result, at least one subsequent pose estimation is generated. At step 516, the method illustratively includes propagating the pose estimations over a time interval by chaining the pose estimation and each succeeding pose estimation one with another according to a sequence in which each was generated. The method 500 illustratively concludes at step 518.

EXAMPLES

Position Estimation Using a Single Planar Patch

Figure 6:
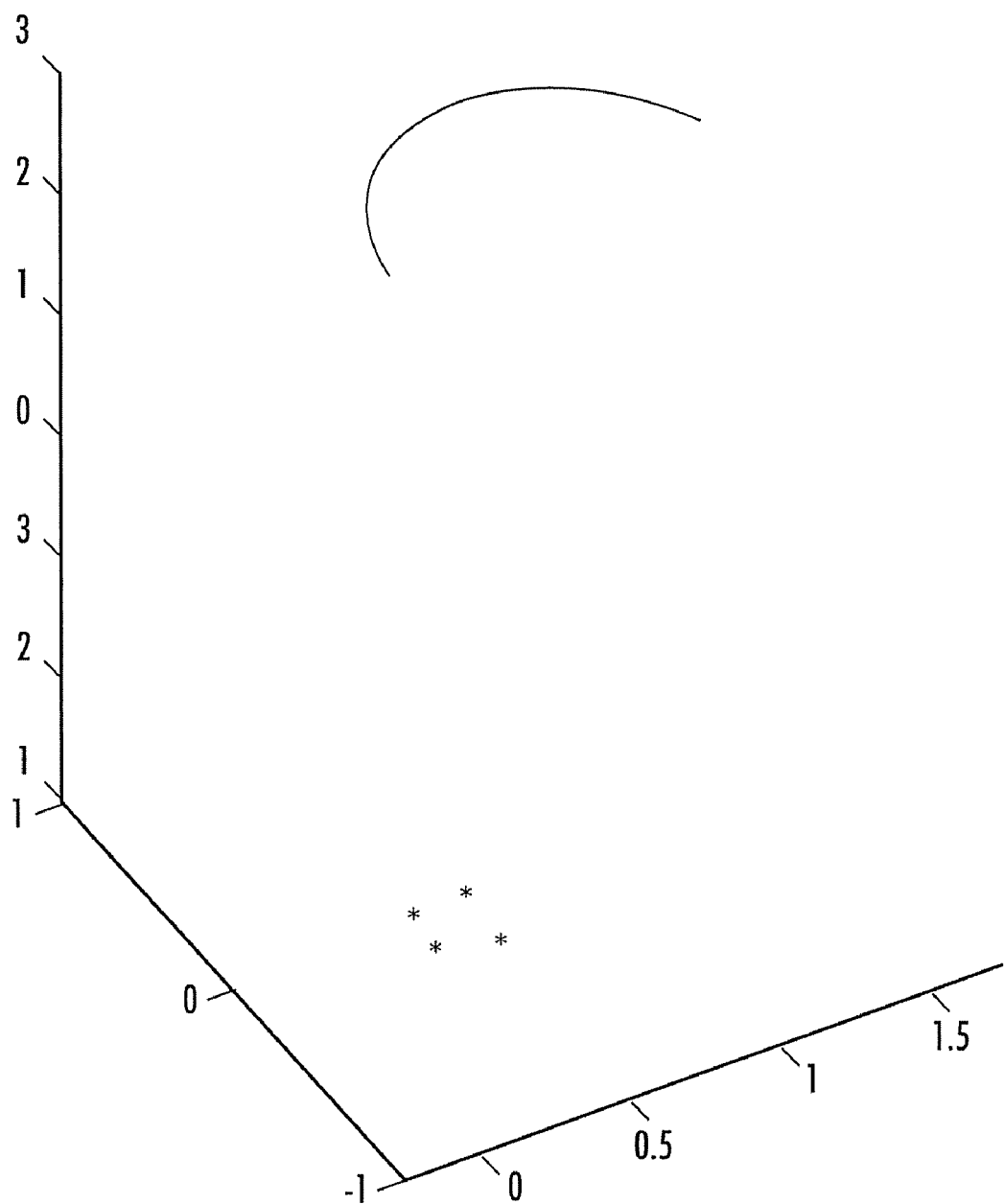
FIG. 6 is a graph of the simulated movement of a camera.

A simulation was performed using a single planar region, or "patch," without the need to daisy-chain multiple planar patches. The scenario is useful in the situation in which an aerial vehicle is to return to a possible GPS-available location. The simulated camera is positioned above four co-planar points and moves in a circular path with constant linear velocity, altitude, and constant angular velocity in the camera frame (e.g., constant thrust and yaw). The simulated movements are depicted by the graph in FIG. 6.

Figure 7:
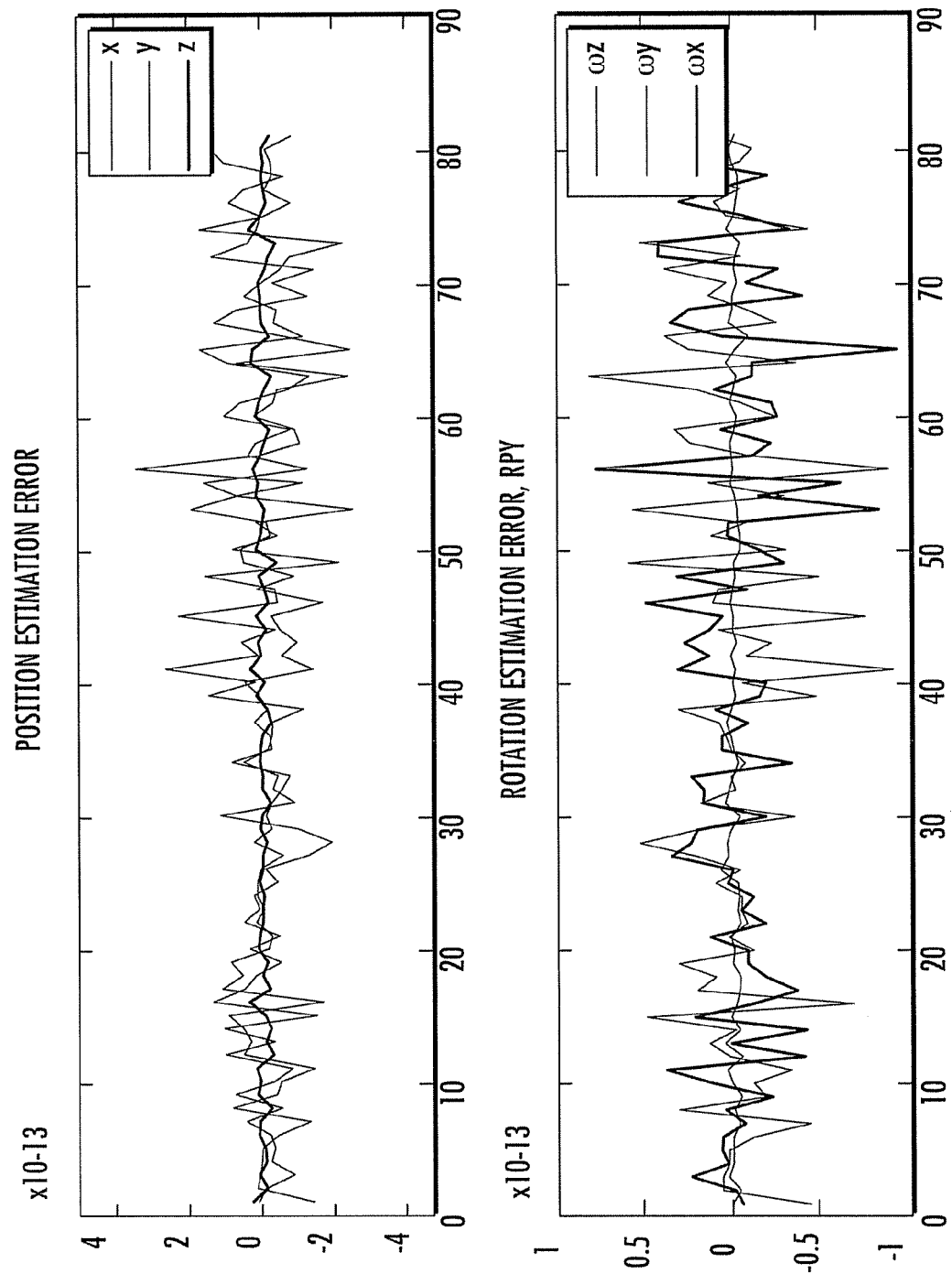
FIG. 7 provides plots of the position and rotation errors in estimating the simulated movements of a camera.

At each time instant, the homography is calculated, and the translation and rotation are determined. The position and orientation of the initial pose is known, including $d(t_0)$ as well as the initial distance of the plane containing the feature points. The position and rotation errors are shown (i.e., as roll-pitch-yaw angles) in FIG. 7.

Figure 8:
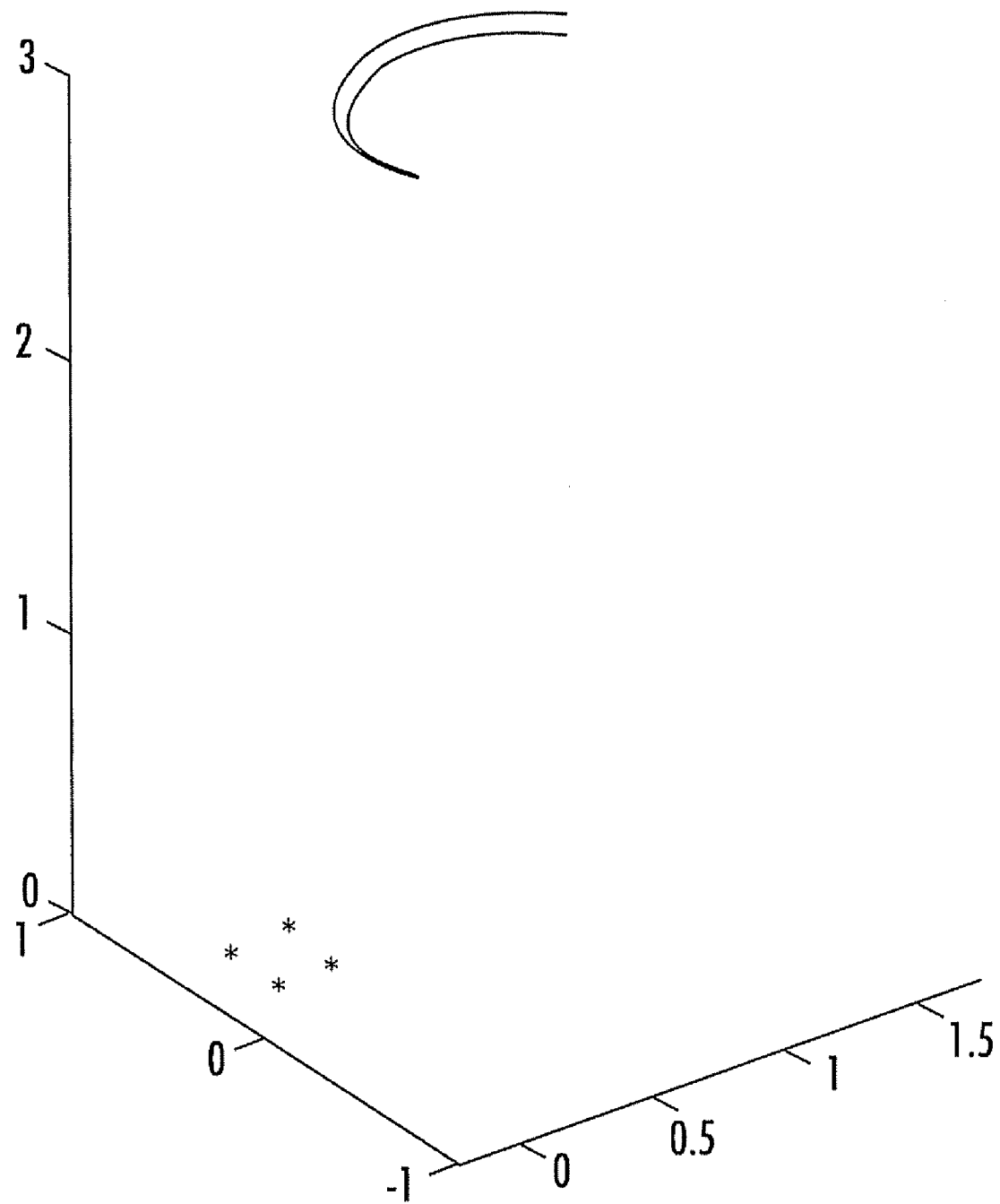
FIG. 8 is a graph showing actual and estimated trajectories for a simulated movement of a camera.
Figure 9:
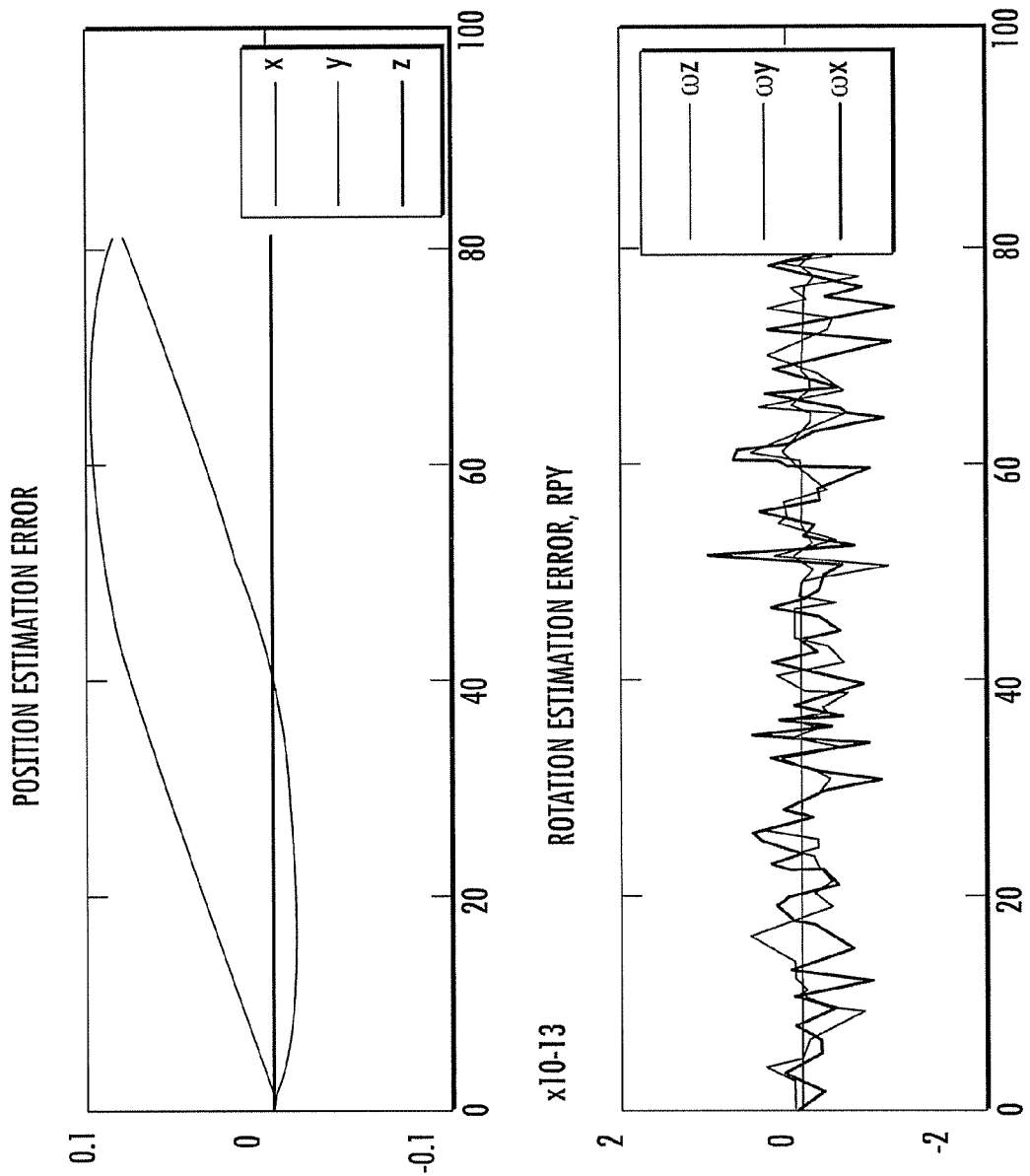
FIG. 9 is a plot of errors in estimating the simulated movements of a camera.

The effects of a poor estimate of $d(t_0)$ were investigated by repeating the simulation, but with $d(t_0)$ offset by 10 percent. The true and estimated trajectories are shown in FIG. 8. The true trajectory is shown by the solid line, and the estimate is shown by the dotted line. The estimation error is shown in FIG. 9. The maximum error corresponds to a 10 percent error in the x direction and a 4 percent error in the y direction. As one would expect, the simulation reveals that rotation error is not affected by the error in estimating $d(t_0)$.

Position Estimation by Daisy-Chaining Multiple Planar Patches

Figure 10:
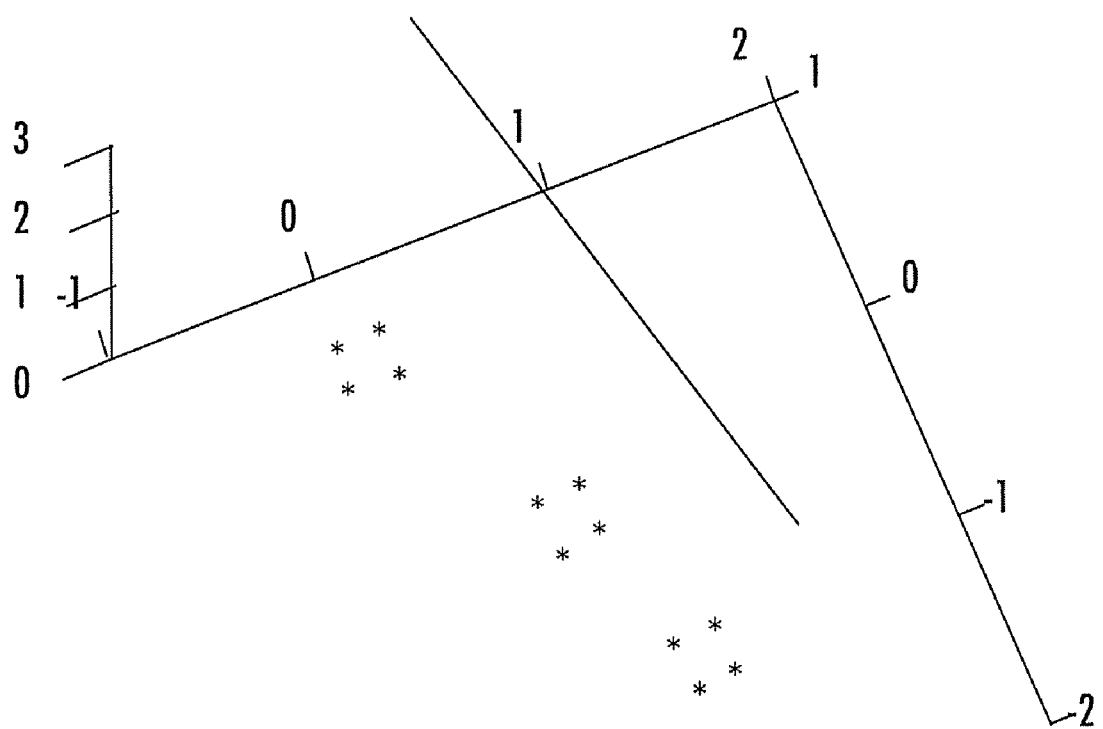
FIG. 10 is another graph of the simulated movements of a camera.
Figure 11:
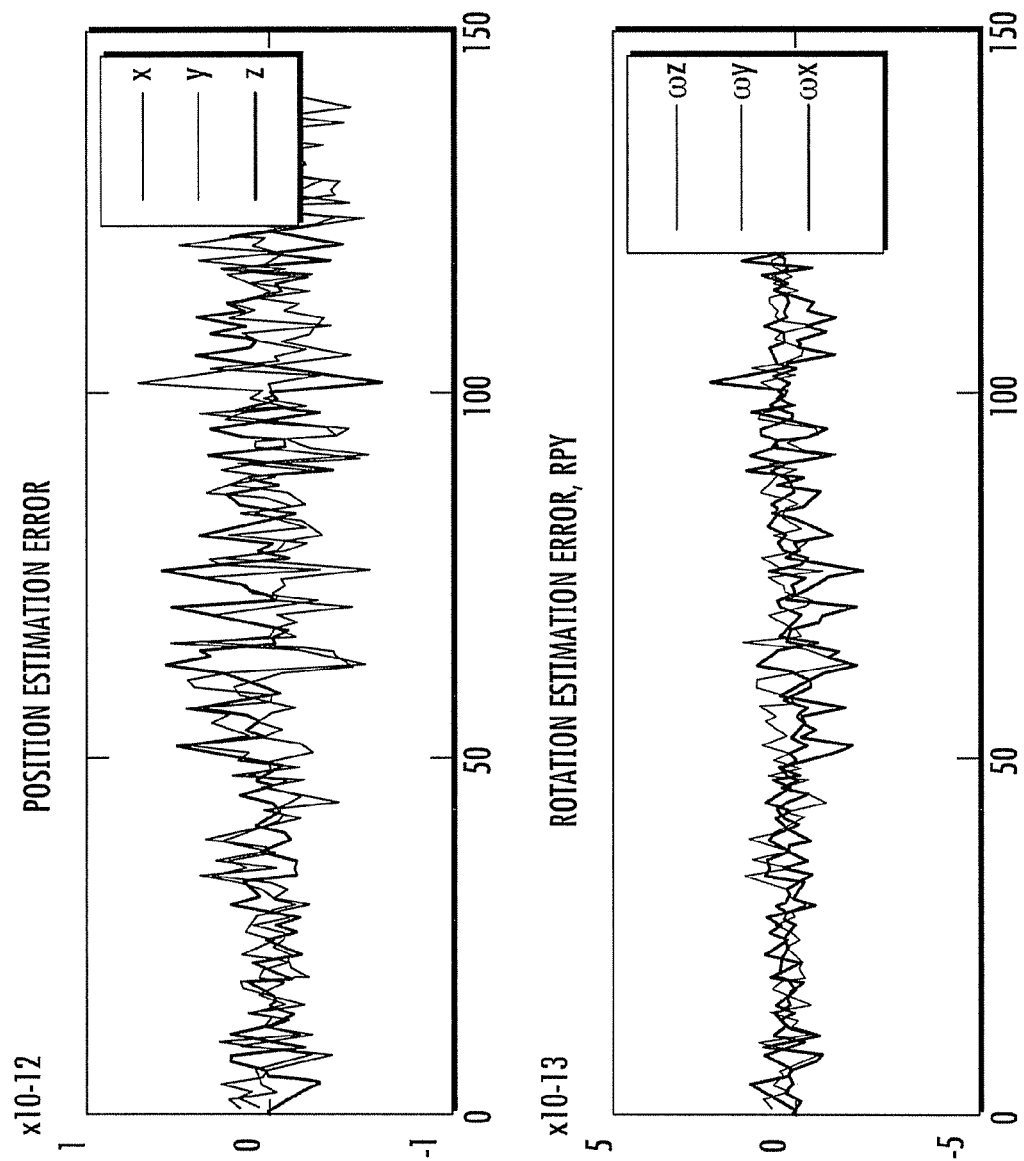
FIG. 11 provides plots of the position and rotation errors in estimating the simulated movements of a camera.

Other simulations were limited to the ideal case that each planar region, or "patch," is in the same plane. The assumption is valid in the context of an aerial vehicle at high altitude over a relatively flat landscape. In simulation, the camera moves over three feature point patches and switches to the closest one at time t=40 and t=80. In FIG. 10, the vehicle is shown moving in a straight path with constant velocity and a slight pitch angle. The pitch angle ensures that $d(t_i) \neq d(t_{i-1})$ for all i>0, and $d(t_i)$ is estimated using equation (10). Plots of the estimation errors in translation and rotation are shown in FIG. 11.

Figure 12:
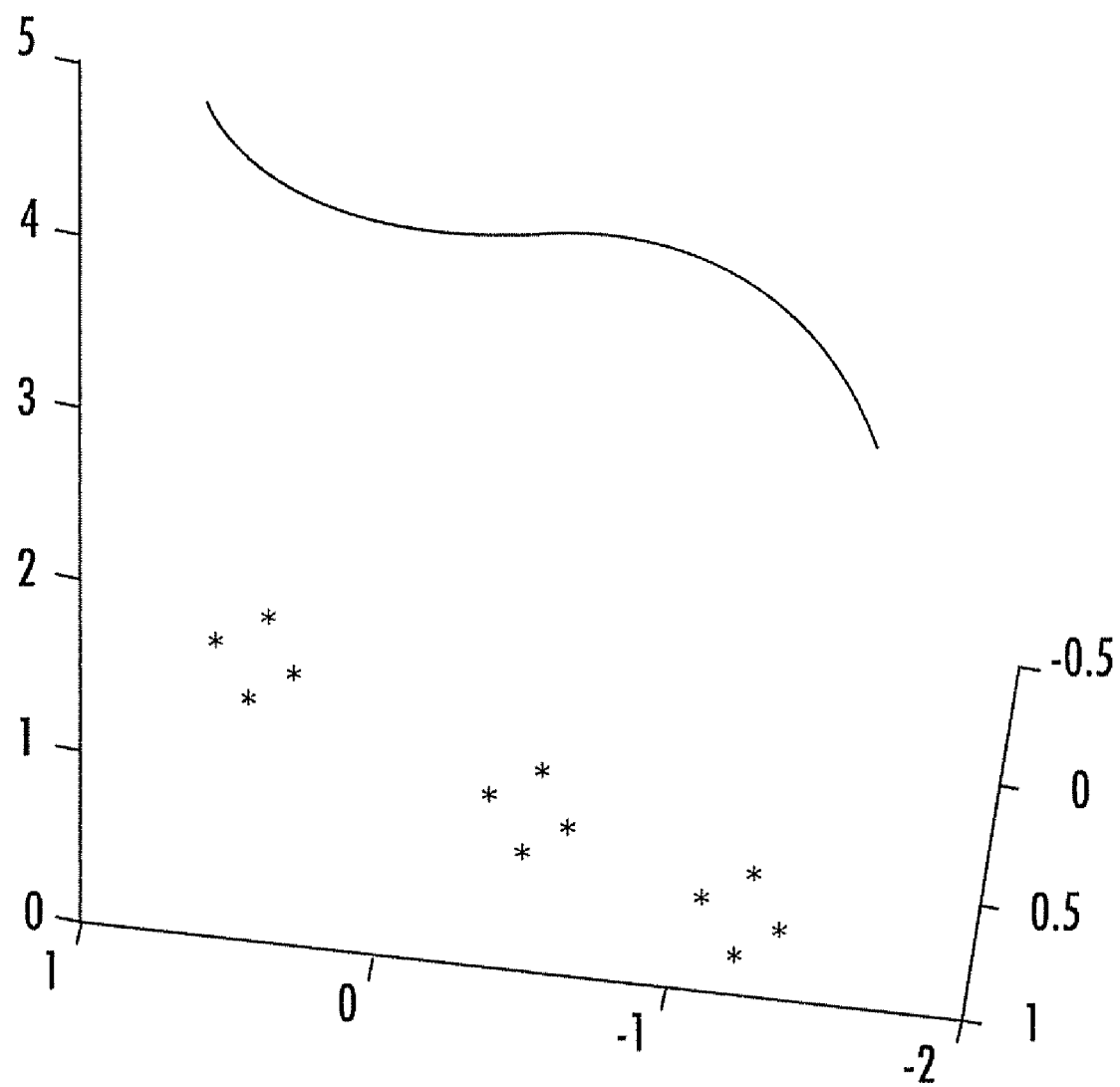
FIG. 12 is a graph of the trajectory of simulated movements of a camera.
Figure 13:
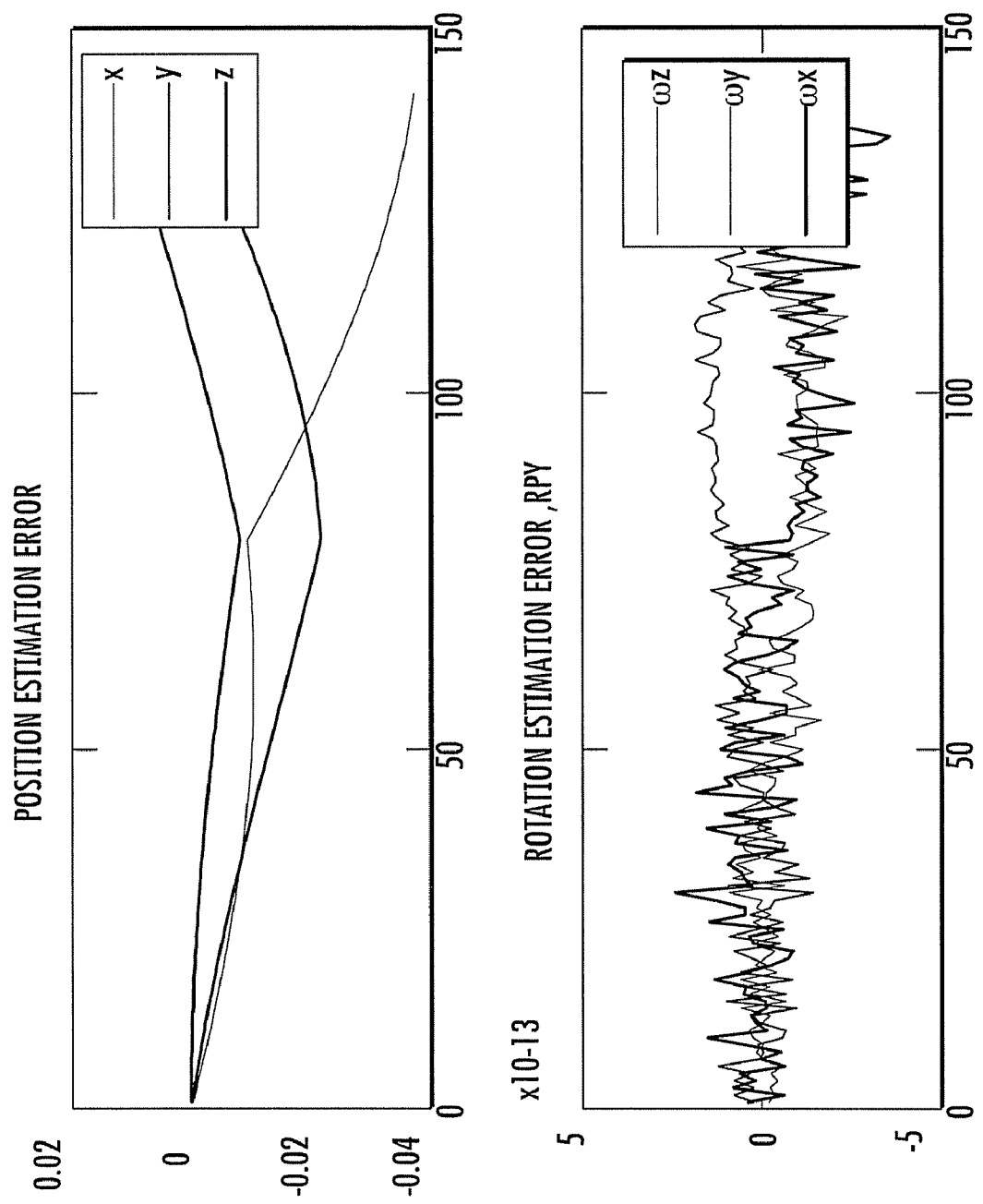
FIG. 13 provides plots of the position and rotation errors in estimating the simulated movements of a camera.

A more complicated trajectory is shown by the graph in FIG. 12. The trajectory given by the solid line is generated by a time-varying linear velocity and a time-varying pitch and yaw angular velocity. Thus, at the switching times t=50 and t=80, $d(t_i)$ must be estimated using equation (10). The estimated position is shown by the dashed line, and some error develops over time for this trajectory. The translation and rotation errors are shown in FIG. 13. Small errors in the position estimation arise from errors in estimating the translation from the homography matrix H(t), but the rotation error remains negligible.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product, specifically, a computer-readable storage medium in which instruction code is embedded, the instructions causing the computer to implement the procedures and methods described herein. Accordingly, when the instruction code is loaded in a computer system, one is able to carry out these methods. More generally, computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A method of estimating position and orientation of a vehicle using image data, the method comprising:
   (a) capturing an image of a region external to the vehicle using a camera mounted to the vehicle, and identifying in the image a set of feature points of the region;
   (b) subsequently capturing another image of the region from a different orientation of the camera, and identifying in the image the same set of feature points;
   (c) generating a pose estimation of the vehicle by determining a Euclidean homography matrix based upon the identified feature points and decomposing the Euclidean homography matrix to determine a scaling factor, a unit normal vector perpendicular to the region, a rotation, and a ratio of a translation to a distance from the camera to the region, wherein the distance is measured by a vector parallel to the unit normal vector;
   (d) generating at least one succeeding pose estimation of the vehicle by repeating steps (a)-(c) with respect to a different region; and
   (e) propagating the pose estimations over a time interval by chaining the pose estimation and each succeeding pose estimation one with another according to a sequence in which each was generated.

2. The method of claim 1, further comprising determining the distance from the camera to the region and, based upon the determined distance, computing the translation from the ratio of the translation to the distance from the camera to the region.

3. The method of claim 2, wherein the step of determining the distance comprises projecting another vector measuring the distance from the camera to the region onto the unit normal vector according to the equation $d = n \cdot a$, where d measures the distance, n is the unit normal vector, and a is the other vector measuring the distance from the camera to the region, wherein the other vector is not parallel to the unit normal vector.

4. The method of claim 2, wherein the rotation measured at a time $t_1$ is $R_{01}(t_1)$, and the translation measured at time $t_1$ is $x_{01}(t_1)$ and further comprising determining, with respect to a constant world frame, a corresponding rotation $R_1(t_1)$ and a corresponding translation $x_1(t_1)$ based upon the equations:

$$R_1 = R_0 R_{01}(t_1),$$

$$x_1 = R_{01} x_{01}(t_1) + x_0$$

where $R_0$ is a previously determined rotation with respect to the constant world frame, $x_0$ is a previously determined translation with respect to the constant world frame.

5. The method of claim 4, wherein the previously determined rotation and translation are determined based upon data generated by an inertial measurement system.

6. The method of claim 2, further comprising determining another distance parallel to another unit normal vector perpendicular to another region based upon the following equation if the two regions are coplanar:

$$d_b(t_1) = d(t_0) + x_{01}(t_1) \cdot n(t_0)$$

where $d_b(t_1)$ is the other distance measure at time $t_1$, $d_a(t_0)$ is the distance measured at time $t_0$, $t_1 > t_0$, $x_{01}(t_1)$ is the translation measured at time $t_1$, and $n(t_0)$ is the unit normal vector determined at time $t_0$.

7. The method of claim 3, further comprising determining another distance parallel to another unit normal vector perpendicular to another region according to the following steps if the two regions are not coplanar:

solve two homography equations, given as $$m_a(t_1) = \frac{z_a(t_0)}{z_a(t)}\left(R + \frac{x}{d_a(t_{1-})} n_a(t_{1-})^T\right) m_a(t_{1-}),$$

and $$m_b(t_1) = \frac{z_b(t_0)}{z_b(t)}\left(R + \frac{x}{d_b(t_{1-})} n(t_0)^T\right) m_b(t_{1-}),$$

where subscripts a and b denote the region and the other region, respectively, where the t's are time indices such that $t_1 > t_0 > t_{1-}$, where the m's are normalized Euclidean coordinates of feature points in the respective regions, wherein the ratios of the z values are scaling factors, wherein R is a rotation, wherein the d's are distances from the camera to the subscript-indicated regions, and wherein the n's are unit normal vectors with respect to the subscript-indicated regions;

determine a translation x with respect to each of the subscript-indicated regions, according to $$x_b = \frac{x}{d_b(t_{1-})},$$

and $$x_a = \frac{x}{d_a(t_{1-})};$$

solve for another translation, x:

$$x = d_a(t_{1-}) x_a;$$

determine the distance $d_b(t_{1-})$ at time $t_{1-}$, according to the following equation:

$$d_b(t_{1-}) = \frac{x_b^T x}{\|x_b\|};$$

and solve for the other distance according to the following equation:

$$d_b(t_1) = d_b(t_{1-}) + x \cdot n(t_{1-}),$$

wherein the inertial measurement system comprises a global positioning system (GPS) and the step of obtaining an initial set of feature points comprises obtaining an initial set of feature points generated by the GPS.

8. A system for estimating position and orientation of a vehicle using image data, the system comprising:
a camera mounted to the vehicle; and
a pose estimator configured to
- (a) cause said camera to capture an image of a region external to the vehicle using a camera mounted to the vehicle, and identify in the image a set of feature points of the region;
- (b) subsequently cause said camera to capture another image of the region from a different orientation relative to the region, and identify in the image the set of feature points;
- (c) generate a pose estimation of the vehicle by determining a Euclidean homography matrix based upon the identified feature points and decomposing the Euclidean homography matrix to determine a scaling factor, a unit normal vector perpendicular to the region, a rotation, and a ratio of a translation to a distance from the camera to the region, wherein the distance is measured by a vector parallel to the unit normal vector;
- (d) generate at least one succeeding pose estimation of the vehicle by repeating steps (a)-(c) with respect to a different region; and
- (e) propagate the pose estimations over a time interval by chaining the pose estimation and each succeeding pose estimation one with another according to a sequence in which each was generated.

9. The system of claim 8, wherein said pose estimator is further configured to determine the distance from the camera to the region and, based upon the determined distance, compute the translation from the ratio of the translation to the distance from the camera to the region.

10. The system of claim 9, wherein said pose estimator is configured to determine the distance by performing a projection of another vector measuring the distance from the camera to the region onto the unit normal vector according to the equation $d = n \cdot a$, where d measures the distance, n is the unit normal vector, and a is the other vector measuring the distance from the camera to the region, wherein the other vector is not parallel to the unit normal vector.

11. The system of claim 9, wherein the rotation measured at a time $t_1$ is $R_{01}(t_1)$, and the translation measured at time $t_1$ is $x_{01}(t_1)$, and wherein the pose estimator is further configured to determine, with respect to a constant world frame, a corresponding rotation $R_1(t_1)$ and a corresponding translation $x_1(t_1)$ based upon the equations:

$$R_1 = R_0 R_{01}(t_1),$$

$$x_1 = R_{01} x_{01}(t_1) + x_0$$

where $R_0$ is a previously determined rotation with respect to the constant world frame, $x_0$ is a previously determined translation with respect to the constant world frame.

12. The system of claim 11, further comprising an inertial measurement system, the previously determined rotation and translation being determined based upon data generated by said inertial measurement system.

13. The system of claim 9, wherein said pose estimator is further configured to determine another distance parallel to another unit normal vector perpendicular to another region based upon the following equation if the two regions are coplanar:

$$d_b(t_1) = d_a(t_0) + x_{01}(t_1) \cdot n(t_0)$$

where $d_b(t_1)$ is the other distance measure at time $t_1$, $d_a(t_0)$ is the distance measured at time $t_0$, $t_1 > t_1$, $x_{01}(t_1)$ is the translation measured at time $t_1$, and $n(t_0)$ is the unit normal vector determined at time $t_0$.

14. The system of claim 9, wherein said pose estimator is further configured to determine another distance parallel to another unit normal vector perpendicular to another region according to the following procedure if the two regions are not coplanar;
solve two homography equations, given as $$m_a(t_1) = \frac{z_a(t_0)}{z_a(t)}\left(R + \frac{x}{d_a(t_{1-})} n_a(t_{1-})^T\right) m_a(t_{1-}),$$

and $$m_b(t_1) = \frac{z_b(t_0)}{z_b(t)}\left(R + \frac{x}{d_b(t_{1-})} n(t_0)^T\right) m_b(t_{1-}),$$

where subscripts a and b denote the region and the other region, respectively, where the t's are time indices such that $t_1 > t_0 > t_{1-}$, where the m's are normalized Euclidean coordinates of feature points in the respective regions, wherein the ratios of the z values are scaling factors, wherein R is a rotation, wherein the d's are distances from the camera to the subscript-indicated regions, and wherein the n's are unit normal vectors with respect to the subscript-indicated regions;
determine a translation x with respect to each of the subscript-indicated regions, according to $$x_b = \frac{x}{d_b(t_{1-})},$$

and $$x_a = \frac{x}{d_a(t_{1-})};$$

solve for another translation, x:

$$x = d_a(t_{1-}) x_a;$$

determine the distance $d_b(t_{1-})$ at time $t_{1-}$, according to the following equation:

$$d_b(t_{1-}) = \frac{x_b^T x}{\|x_b\|};$$

and
solve for the other distance according to the following equation:

$$d_b(t_1) = d_b(t_{1-}) + x \cdot n(t_{1-}).$$

15. A non-transitory computer-readable storage medium having embedded therein instruction code for causing the computer to:
- (a) capture an image of a region external to a vehicle, the image captured using a camera mounted to a vehicle, and identify in the image a set of feature points of the region;
- (b) subsequently capture another image of the region, the other image captured using the camera at a different orientation relative to the region, and identify in the other image the set of feature points;

(c) generate a pose estimation of the vehicle by determining a Euclidean homography matrix based upon the identified feature points and decomposing the Euclidean homography matrix to determine a scaling factor, a unit normal vector perpendicular to the region, a rotation, and a ratio of a translation to a distance from the camera to the region, wherein the distance is measured by a vector parallel to the unit normal vector;

(d) generate at least one succeeding pose estimation of the vehicle by repeating steps (a)-(c) with respect to a different region; and (e) propagate the pose estimations over a time interval by chaining the pose estimation and each succeeding pose estimations one with another according to a sequence in which each was generated.

16. The non-transitory computer-readable storage medium of claim 15, further comprising instruction code for causing the computer to determine the distance from the camera to the region and, based upon the determined distance, compute the translation from the ratio of the translation to the distance from the camera to the region.

17. The non-transitory computer-readable storage medium of claim 16, wherein the procedure for determining the distance comprises projecting another vector measuring the distance from the camera to the region onto the unit normal vector according to the equation $d = n \cdot a$, where d measures the distance, n is the unit normal vector, and a is the other vector measuring the distance from the camera to the region, wherein the other vector is not parallel to the unit normal vector.

* * * * *